Feb. 17, 1959

B. B. JACOBSEN
DISTORTION ELIMINATION IN RADIO REPEATER SYSTEMS EMPLOYING FREQUENCY MODULATION
Filed Sept. 13, 1954

2,874,273

For Station 3: $F_2 = F_1 - f$
$F_3 = F_4 - f$
For Station 4: $F_2 = F_4 + f$
$F_3 = F_1 + f$ R.R. Radio Receiver
R.T. Radio Transmitter Inventor
B. B. JACOBSEN
By Philip M. Bolton
Attorney United States Patent Office 2,874,273

Patented Feb. 17, 1959

2,874,273

DISTORTION ELIMINATION IN RADIO REPEATER SYSTEMS EMPLOYING FREQUENCY MODULATION

Bent Bulow Jacobsen, London, England, assignor to International Standard Electric Corporation, New York, N. Y., a corporation of Delaware Application September 13, 1954, Serial No. 455,721

Claims priority, application Great Britain September 21, 1953

5 Claims. (Cl. 250—15)

The present invention relates to radio communication systems employing frequency or phase modulation of the carrier wave, and concerns particularly the arrangements at the intermediate repeaters of such systems.

In the case of frequency modulation systems employing microwaves, it is normally the practice to design the radio repeaters so that the frequency of the outgoing carrier wave is slightly different from that of the incoming carrier wave, in order to avoid coupling between the output and the input which may cause the repeater to oscillate. Thus, for example, at a given repeater the frequency of the incoming carrier wave may be 4,000 megacycles per second, while that of the outgoing carrier wave may be 4,040 megacycles per second, while in the case of the next repeater, these frequencies are interchanged. It has also been the usual practice to arrange so that the frequencies of the two local oscillators commonly used at the repeaters for producing the necessary frequency changes are always below (or always above) the corresponding incoming and outgoing carrier frequencies, respectively.

This arrangement preserves the sense of the frequency deviation throughout the system.

In radio repeaters of this kind it is found that asymmetric effects in the intermediate frequency filters are often present, and result in the introduction of second order distortion.

Similar considerations hold for phase modulation systems, and the present invention is directed to reducing the effects of asymmetry in the filters of phase or frequency modulation systems.

The invention accordingly provides a radio communication system in which signals are conveyed from a radio transmitting terminal over a plurality of repeater stations to a radio receiving terminal by phase or frequency modulation of high frequency carrier waves, in which each repeater station comprises means for transforming the frequency of the modulated carrier waves, characterised in this, that the repeater station circuits are so disposed that a reversal of the sense of the phase or frequency deviation occurs in the transforming means in at least one of the said repeater stations, and that no such reversal occurs in the transforming means in at least another of the said repeater stations.

The invention will be described with reference to the accompanying drawing. Although the embodiments described will be generally assumed to employ frequency modulation, it will be understood that the arrangements according to the invention do not have to be modulated if phase modulation is used.

Figure 1:
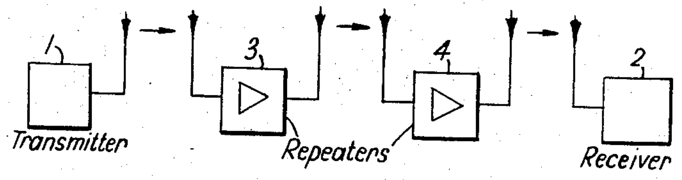
Fig. 1 shows a block schematic circuit diagram of a radio communication system including repeaters to which the principle of the invention may be applied.

Referring to Fig. 1, a frequency modulation radio communication system comprises a terminal transmitting station 1 and a terminal receiving station 2 of conventional type, and interposed between these terminal stations are any number of repeater stations of which only two are shown, and are designated 3 and 4.

Figure 2:
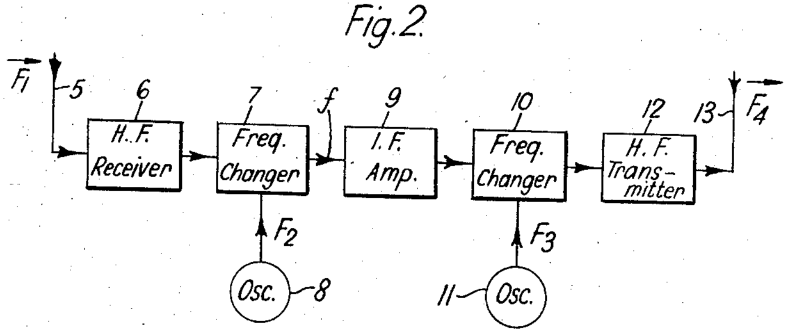
Fig. 2 shows a block schematic circuit diagram of one of the repeaters.

Fig. 2 shows details of one of the repeater stations, which are all alike, except as regards the frequencies involved, as will be explained later. In Fig. 2, the incoming frequency modulated carrier wave of frequency $F_1$ is received on an antenna 5 connected to a high frequency receiver 6 (which may consist only of a high frequency filter), the output of which is connected to a frequency changer 7 to which is also connected a local oscillator 8 supplying a heterodyne frequency $F_2$.

The wave at the intermediate frequency $f$ from the output of the frequency changer 7 is amplified by the amplifier 9 and is applied to a second frequency changer 10 supplied from a local oscillator 11 supplying a heterodyne frequency $F_3$ in order to raise the frequency to the frequency $F_4$ for the outgoing waves, which are radiated by a high frequency amplifier 12 connected to an antenna 13.

This arrangement as described so far is conventional, and the invention lies in the choice of the frequencies $F_2$ and $F_3$. As has already been stated, it has been the normal practice to choose $F_2$ less than $F_1$, and $F_3$ less than $F_4$ at all repeaters; or alternatively, $F_2$ and $F_3$ are chosen greater than $F_1$ and $F_4$, respectively, at all repeaters. Now it has been found that the phase-shift-frequency characteristic of the intermediate frequency filters of conventional type is usually unsymmetrical with respect to the mean intermediate frequency, and this introduces systematic second and higher even order distortion into the modulating signal wave.

There will also be random asymmetric distortion due to minor imperfections of the repeater circuits.

According to the usual method of choosing the frequencies $F_2$ and $F_3$, the sense of the frequency deviation of the intermediate frequency wave is the same at all repeaters, and the effect of the systematic even order distortion therefore tends to increase with each repetition since it will be in the same phase at all repeaters. According to the invention, however, $F_2$ and $F_3$ are differently chosen at alternate repeaters in such manner that the sense of the frequency deviation of the intermediate frequency wave is opposite at adjacent repeaters. This causes the total systematic even order distortion introduced by half the repeaters to be opposite in phase to the total systematic even order distortion introduced by the other half, and the overall distortion is therefore reduced by cancellation. The random asymmetric distortion is however not appreciably changed by this expedient. In what follows it will always be the systematic even order distortion which is considered.

To illustrate this process, let $F_2$ and $F_3$ at the repeater station 3 (Fig. 1) be chosen so that $F_2=F_1-f$, and $F_3=F_4-f$. Then if at any time the deviation of the incoming frequency $F_1$ is $+d$, the deviation of the intermediate frequency $f$ and also the output frequency $F_4$ will be $+d$. According to the invention, the frequencies $F_2$ and $F_3$ at repeater station 4 (Fig. 1) will be chosen so that $F_2=F_4+f$ and $F_3=F_1+f$. Now it will be seen that if $+d$ is the frequency deviation of the incoming frequency $F_1$, then the deviation of the intermediate frequency $f$ will now be $-d$, that is, it will be in the sense opposite to the intermediate frequency deviation at the station 3. The deviation of the output frequency $F_4$ will however be $+d$ as before. The even order distortion introduced by the intermediate frequency filters at station 3 will thus be subtracted from the even order distortion introduced by the corresponding filters at station 4.

When there are more than two repeater stations, the heterodyne frequencies $F_2$ and $F_3$ at half the repeater stations will be chosen as described for station 3, and for the remaining repeater stations as described for station 4. Preferably, though not essentially, the frequencies $F_2$ and $F_3$ at all the odd numbered repeater stations counting from one end of the system will be chosen as for station 3, and those for all the even numbered stations as for station 4.

A particular selection of the frequencies in a practical case will now be given. Let $F_1=4{,}000$ megacycles per second at the input of repeater station No. 3 (Fig. 1) and let $F_4=4{,}040$ megacycles per second, which differs from $F_1$ by the desired small amount of 40 megacycles per second. Let the intermediate frequency $f$ be 60 megacycles per second. Then at station 3, $F_2=4{,}000-60=3{,}940$ megacycles per second and $F_3=4{,}040-60=3{,}980$ megacycles per second. However at station 4, the input frequency $F_1$ is now 4,040 megacycles per second and the output frequency $F_4$ is 4,000 megacycles per second, and so, according to the invention $F_2=4{,}040+60=4{,}100$ megacycles per second and $F_3=4{,}000+60=4{,}060$ megacycles per second.

It is evident that $F_1$ and $F_4$ could have been interchanged at both stations, in which case $F_2$ and $F_3$ will be interchanged at both stations.

It should be pointed out that if the mean intermediate frequency $f$ in a repeater drifts slightly from the normal value, second order distortion is liable to be introduced, but if the local oscillator frequencies $F_2$ and $F_3$ are chosen according to the present invention, reduction of this type of even order distortion is also obtained. If therefore the mean carrier frequency generated by the transmitter station 1 (Fig. 1) should depart from the design value, the distortion in the individual repeaters which results will also tend to cancel out over the whole system. This will be evident, since a drift in the mean carrier frequency is equivalent to modulation by a very low frequency signal wave.

Figure 3:
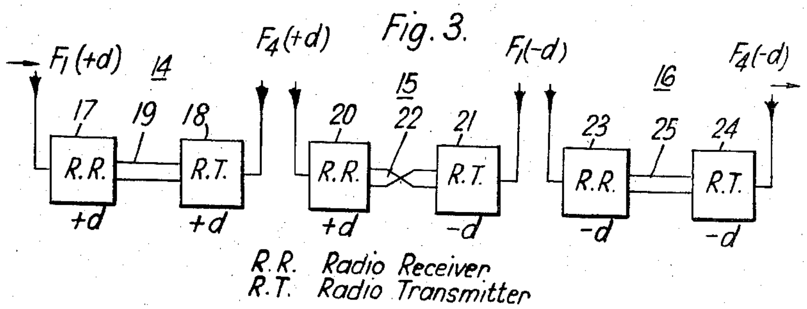
Fig. 3 shows a block schematic circuit diagram of three successive repeaters to illustrate another aspect of the invention.

In certain cases the radio repeaters may each consist of a complete radio receiver similar to 2 immediately followed by a complete radio transmitter similar to 1. In that case the carrier wave is completely demodulated in the receiver to recover the modulating signal wave, which is then used to remodulate the transmitter. The principles of the invention may be applied to this type of repeater in the manner indicated in Fig. 3. This shows three successive intermediate repeater stations 14, 15 and 16.

Station 14 comprises a radio receiver 17 and a radio transmitter 18. The output terminals of the radio receiver 17 at which the modulating signal wave appears are connected directly to the corresponding input terminals of the radio transmitter 19 over a pair of conductors 19. Station 15 comprises a radio receiver 20 connected similarly to a radio transmitter 21 over a pair of conductors 22. Station 16 likewise comprises a radio receiver 23 connected directly to a radio transmitter 24 over a pair of conductors 25. It will be assumed that the receivers 17 and 23 are identical, and that receiver 20 differs from them only in the frequency of the local heterodyne oscillator (not shown) since the incoming frequency is $F_4$ instead of $F_1$; and similarly for the transmitters 18, 21 and 24. According to the invention, the conductors 19 and 25 at stations 14 and 16 are connected straight, as shown, while the corresponding conductors 22 at station 15 are connected in reverse as shown, so that the phase of the signal wave applied to the transmitter 21 is reversed, while no such phase reversal occurs at stations 14 and 16. When there are more than three repeater stations the phase reversal is made at every alternate station.

If the deviation of the frequency or phase modulated waves received by the radio receiver 17 is $+d$, for example, then assuming for clearness that the local oscillator frequencies in all the receivers and transmitters are lower than the corresponding input or output mean frequencies, it will be seen that the deviation of the intermediate frequency waves will be $+d$ in elements 17, 18 and 20, and in the path between stations 14 and 15, and will be $-d$ in elements 21, 23 and 24 and in the path between stations 15 and 16. By considering the group of elements 18, 20, 21 and 23, it will be seen that the deviations in the transmitters 18 and 21 are opposite in sign, as also are the deviations in the receivers 20 and 24, and accordingly cancellation of even order distortion is thus produced. In the case where there are a large number of repeaters, it will be found that a similar cancellation occurs in every group consisting of two elements on either side of a reversed connection like 22. It will be found also that there will be successive pairs of radio receivers and successive pairs of radio transmitters with opposite deviations, whether the heterodyne oscillator frequencies are above or below the corresponding input or output frequencies, so long as the arrangement is the same in all receivers and in all transmitters.

It may be added that the overall even order asymmetric distortion introduced by the discriminators in the radio receivers, and by the modulators in the radio transmitters will also be reduced by the arrangements described, in the same way as that introduced by the intermediate frequency filters.

While the principles of the invention have been described above in connection with specific embodiments, and particular modifications thereof, it is to be clearly understood that this description is made only by way of example and not as a limitation on the scope of the invention.

What I claim is:

1. A radio-communication system, of the kind in which signals are conveyed from a transmitting terminal station to a receiving terminal station by frequency or phase modulation of high frequency carrier waves, there being two repeater stations between the said terminal stations, and in which each repeater station comprises means for transforming an incoming modulated high frequency carrier wave to a corresponding modulated intermediate frequency wave and means for transforming the modulated intermediate frequency wave to an outgoing modulated high frequency wave, characterised in this, that the transforming means at each of the said repeater stations comprises a first local oscillator associated with a first frequency changer and a second local oscillator associated with a second frequency changer, the frequenies of the first and second oscillators of one of said stations being selected to be respectively higher than the frequencies of the incoming and outgoing high frequency carrier waves at that station, and the frequencies of the first and second oscillators of the other station being selected to be respectively lower than the frequencies of the incoming and outgoing high frequency carrier waves at said other station.

2. A radio-communication system in which signals are conveyed from a transmitting station over a plurality of intermediate repeater stations to a receiving station by frequency modulation of high frequency carrier waves, and in which each repeater station includes a first frequency changer for deriving frequency-modulated intermediate frequency waves from the incoming high frequency carrier waves, and a second frequency changer for deriving the outgoing frequency-modulated high frequency carrier waves from the intermediate frequency waves, characterised in this, that the repeater stations are divided into first and second groups, first and second local oscillators associated respectively with first and second frequency changers at each of the repeater stations, the frequencies of the first and second oscillators of the stations of the first group being selected to be respectively lower than the incoming and outgoing high frequency carrier waves at the stations of said first group and the frequencies of the first and second oscillators of the stations of the second group being selected to be respectively higher than the incoming and outgoing high frequency carrier waves at the stations of said second group.

3. A system according to claim 2, characterised in this, that the repeater stations of the first group alternate with the repeater stations of the second group.

4. A system according to claim 2 or 3, characterised in this, that the mean intermediate frequency is substantially the same at all repeater stations.

5. A system according to claim 2 or 3, characterised in this that at each repeater station the mean outgoing carrier frequency differs from the mean incoming carrier frequency substantially by a given amount, the same for all repeater stations.

References Cited in the file of this patent

UNITED STATES PATENTS

| | | |
|---|---|---|
| 2,406,932 | Tunick | Sept. 3, 1946 |
| 2,407,212 | Tunick | Sept. 3, 1946 |

OTHER REFERENCES

"Microwave Relay Link for Television," Electrical Communication (I. T. & I.) magazine, vol. 30, No. 1 March 1953, pages 2 to 8.